(12) United States Patent
Berger et al.

(10) Patent No.: US 8,558,207 B2
(45) Date of Patent: Oct. 15, 2013

(54) PHOTOSTIMULABLE PLATE READING DEVICE

(75) Inventors: Amir Berger, Kiryat Bialik (IL); Jean Marc Inglese, Bussy Saint Georges (FR); Sergey Zaslavsky, Kiryat Yam (IL); Moshe Cohen-Erner, Yokneam (IL); Tan Wang, PuDong (CN)

(73) Assignee: Carestream Health, Inc., Rochester, NY (US)

( * ) Notice: Subject to any disclaimer, the term of this patent is extended or adjusted under 35 U.S.C. 154(b) by 893 days.

(21) Appl. No.: 12/568,993

(22) Filed: Sep. 29, 2009

(65) Prior Publication Data
US 2011/0073787 A1 Mar. 31, 2011

(51) Int. Cl.
*G01N 23/04* (2006.01)
*G01T 1/105* (2006.01)
*H05B 33/00* (2006.01)

(52) U.S. Cl.
USPC .......................... 250/585; 250/586; 250/484.4

(58) Field of Classification Search
USPC ........................................ 250/585, 586, 484.4
See application file for complete search history.

(56) References Cited

U.S. PATENT DOCUMENTS

| | | | | |
|---|---|---|---|---|
| 4,896,043 A * | 1/1990 | Arakawa et al. | ........... | 250/484.4 |
| 4,931,642 A * | 6/1990 | Hosoi et al. | .................... | 250/586 |
| 4,999,505 A | 3/1991 | Gasper et al. | | |
| 5,066,864 A | 11/1991 | Brandner et al. | | |
| 5,864,146 A | 1/1999 | Karellas | | |
| 6,707,058 B2 * | 3/2004 | Akimoto et al. | .............. | 250/585 |
| 2001/0011714 A1 * | 8/2001 | Yasuda | ........................ | 250/589 |
| 2002/0190219 A1 * | 12/2002 | Mooney | ........................ | 250/397 |
| 2004/0071332 A1 * | 4/2004 | Bruce et al. | .................... | 382/133 |
| 2004/0135098 A1 * | 7/2004 | Katagiri | ...................... | 250/484.5 |
| 2005/0051447 A1 * | 3/2005 | Nakajo et al. | .................. | 206/455 |
| 2006/0091337 A1 | 5/2006 | Mair | | |
| 2008/0035859 A1 * | 2/2008 | Molteni et al. | ............. | 250/484.4 |

FOREIGN PATENT DOCUMENTS

| | | |
|---|---|---|
| CN | 201920740 U | 8/2011 |
| EP | 0 863 657 | 9/1998 |
| EP | 2 078 493 | 7/2009 |
| JP | 08327798 | 12/1996 |

OTHER PUBLICATIONS

Communication Pursuant to Article 94(3) EPC dated Dec. 23, 2010, from the European Patent Office re: Application No. 10 010 062.7.

* cited by examiner

*Primary Examiner* — David Porta
*Assistant Examiner* — Mindy Vu (57) ABSTRACT

A photostimulable plate reading device. The device includes: at least one photostimulable plate carrying image data and having two opposite surfaces; an illuminator for homogeneously illuminating a first one of the two opposite surfaces of the at least one photostimulable plate with light emitted in a first wavelength range, the illumination causing the at least one photostimulable plate both to emit light in a second wavelength range by photostimulated luminescence and to scatter light in the first wavelength range; a filter for preventing the light scattered in the first wavelength range from passing and for allowing the light emitted in the second wavelength range to pass, the filter facing a second one of the two opposite surfaces of the at least one photostimulable plate; and a detector composed of a two dimensional array of pixels for detecting the light allowed to pass and for obtaining image data therefrom.

26 Claims, 4 Drawing Sheets

PHOTOSTIMULABLE PLATE READING DEVICE

FIELD OF THE INVENTION

Devices and methods consistent with the present invention relate to photostimulable plate reading devices and methods for reading photostimulable plates.

BACKGROUND OF THE INVENTION

A photostimulable plate, also referred to as Photostimulable Storage Phosphor (PSP), is to detect image data relating to an object/human body which is exposed to X-rays. The method of radiographic image acquisition using a PSP will be referred to as CR (for Computed Radiography) in the following.

The photostimulable plate or PSP comprises a substrate which serves as a support for a phosphor layer on top of which is coated a protective layer.

In particular, a CR system includes an X-rays controlled source which illuminates an object with X-rays and a photostimulable plate or PSP disposed behind the object and which acquires the X-rays attenuated by their passage through the object and transforms them into a latent image that is stored within the PSP's phosphor layer.

Such a CR system further includes a CR reader, the purpose of which is to extract the image data carried by the photostimulable plate or PSP.

The CR system then employs digital electronics in order to process the extracted image data and produce an image under the form of a computed radiograph.

In a known manner, a CR reader comprises a laser source which emits a laser beam focussed at a spot on the surface of the PSP.

The laser beam illuminates a surface spot and stimulates the phosphor layer according to the well known photostimulated luminescence principle.

The laser light constituting the beam is of red colour, for example.

Following this principle, a portion of incident red laser light is converted into stimulated blue light which, in turn, is received and detected by a Photomultiplier Tube (PMT). The intensity of the radiated blue light is proportional in particular to the latent image data. The PMT converts the intensity of the blue light into a digital signal which is then transformed into a radiological image. This image is intended to be exploited by the dentist and may be, for example, displayed for an easier exploitation.

In order to improve the collection of the stimulated blue light, an optical device such as a reflecting cavity is arranged in close relation to the surface portion, between the latter and the PMT.

It is to be noted that the remaining portion of the incident red laser light which is not converted into blue light scatters in different directions beyond the portion of the phosphor layer which is illuminated by the laser beam.

This is detrimental to the efficiency of the CR reader.

A part of the scattered red light is also directed toward the PMT, which requires the use of an interference filter between the PMT and the PSP. As the PMT cannot discriminate between signal data (blue light) and parasitic data (red light), the interference filter is used to filter red light out, with a rejection ratio of for example greater than 10 exp-6.

Further, once the reading is completed the CR reader is moved over a small distance relative to the PSP so that another surface portion thereof is illuminated and another image data reading is performed as briefly mentioned above.

These operations are repeated until the whole PSP is read.

A drawback of this reading method is that it takes several seconds to read the whole PSP. This duration depends on the size of the PSP and the number of the scanning steps.

Accordingly, it is an object of the invention to increase the efficiency when reading a PSP.

It is another object to reduce the time taken for reading a PSP.

It is yet another object to make easier the reading of a PSP.

SUMMARY OF THE INVENTION

According to a first aspect, a photostimulable plate reading device, comprises: at least one photostimulable plate carrying image data and having two opposite surfaces; illuminating means for homogeneously illuminating a first one of the two opposite surfaces of the at least one photostimulable plate with light emitted in a first wavelength range, the illumination causing the at least one photostimulable plate both to emit light in a second wavelength range by photostimulated luminescence and to scatter light in the first wavelength range; filtering means for preventing the light scattered in the first wavelength range from passing and for allowing the light emitted in the second wavelength range to pass, the filtering means facing a second one of the two opposite surfaces of the at least one photostimulable plate; and detecting means composed of a two-dimensional array of pixels for detecting the light allowed to pass and for obtaining image data therefrom.

The photostimulable plate reading device according to the invention makes it possible to increase the efficiency when reading a PSP, reduce the time taken for such a reading and facilitate the reading.

More particularly, the at least one photostimulable plate is in close contact with the filtering means.

For instance, the at least one photostimulable plate is glued to the filtering means.

The at least one photostimulable plate may comprise: a substrate having two opposite surfaces and that is transparent to light emitted in the first wavelength range; and a phosphor layer having two opposite surfaces and being arranged by a first surface on one of the two opposite surfaces of the transparent substrate, the second opposite surface of the phosphor layer facing the filtering means.

More particularly, the transparent substrate may face the illuminating means.

The filtering means may be adapted to allow substantially 1000000 times more light emitted in the second wavelength range to pass than light emitted in the first wavelength range.

The at least one photostimulable plate may be arranged between the illuminating means and the filtering means.

According to one feature, the filtering means includes a block of optical fibers, each optical fiber having a core with a refractive index around 1.8 and a clad surrounded by the core, the clad having a refractive index around 1.5.

Further, the optical fibers are made from a glass material commercialized by the company Shanghai Fan Guang Ltd. Co. under the reference ZB2 and which contains at least 35% more metallic oxide than ZB2 glass material so as to have a core refractive index around 1.8.

The filtering means may include a block of optical fibers having two opposite surfaces and a thin multilayered filter disposed on one of the two opposite surfaces of the block of optical fibers facing the second one of the two opposite surfaces of the at least one photostimulable plate, the thin multilayered filter preventing light scattered in the first wavelength range from passing and allowing light emitted in the second wavelength range to pass, the block of optical fibers guiding light emitted in the second wavelength range and allowed to pass.

More particularly, the thin multilayered filter includes several superimposed layers having each a different refractive index.

The superimposed layers may be for example glass layers.

The thin multilayered filter may have a thickness comprised between 10 and 500 µm.

The block of optical fibers may be transparent to light emitted in the first wavelength range.

The block of optical fibers may advantageously further prevent light scattered in the first wavelength range from passing and allows light emitted in the second wavelength range to pass.

The block of optical fibers may have a numerical aperture limiting the incidence of light allowed to pass by the thin multilayered filter.

The block of optical fibers may be thick.

For example, the block of optical fibers may have a thickness comprised between 1 mm and several centimetres.

The filtering means may include a block of optical fibers having two opposite surfaces and two thin multilayered filters each respectively disposed on one of the two opposite surfaces of the block of optical fibers, the thin multilayered filters preventing light scattered in the first wavelength range from passing and allowing light emitted.

The thin multilayered filter includes several superimposed layers having each a different refractive index.

The superimposed layers may be for example glass layers.

The thin multilayered filter may have a thickness comprised between 10 and 500 µm.

The block of optical fibers may be transparent.

The block of optical fibers may further prevent light scattered in the first wavelength range from passing and allows light emitted in the second wavelength range to pass.

The block of optical fibers may have a numerical aperture limiting the incidence of light allowed to pass by the thin multilayered filter.

The block of optical fibers may be thick.

More particularly, the block of optical fibers may have a thickness comprised between 1 mm and several centimeters.

For instance, light emitted in a first wavelength range is of red colour and light emitted in a second wavelength range is of blue colour.

According to another aspect, a photostimulable plate reading device comprises: at least one photostimulable plate carrying image data and having two opposite surfaces; illuminating means for homogeneously illuminating a first one of the two opposite surfaces of the at least one photostimulable plate with light emitted in a first wavelength range, the illumination causing the at least one photostimulable plate both to emit light in a second wavelength range by photostimulated luminescence and to scatter light in the first wavelength range; filtering means for allowing substantially 1000000 times more light emitted in the second wavelength range to pass than light emitted in the first wavelength range, the filtering means facing a second one of the two opposite surfaces of the at least one photostimulated plate; and detecting means composed of a two-dimensional array of pixels for detecting the light allowed to pass and for obtaining image data therefrom.

According to still another aspect, a photostimulable plate reading device comprises: at least one photostimulable plate carrying image data; illuminating means for homogeneously illuminating the at least one photostimulable plate with light emitted in a first wavelength range, the illumination causing the at least one photostimulable plate both to emit light in a second wavelength range by photostimulated luminescence and to scatter light in the first wavelength range; filtering means for preventing the light scattered in the first wavelength range from passing and for allowing the light emitted in the second wavelength range to pass, the at least one photostimulable plate being arranged between the illuminating means and the filtering means; and detecting means composed of a two-dimensional array of pixels for detecting the light allowed to pass and for obtaining image data therefrom.

BRIEF DESCRIPTION OF THE DRAWINGS

The aspect of the present invention will become more apparent by describing in detail illustrative, non-limiting embodiments thereof with reference to the accompanying drawings.

DETAILED DESCRIPTION OF THE INVENTION

Figure 1:
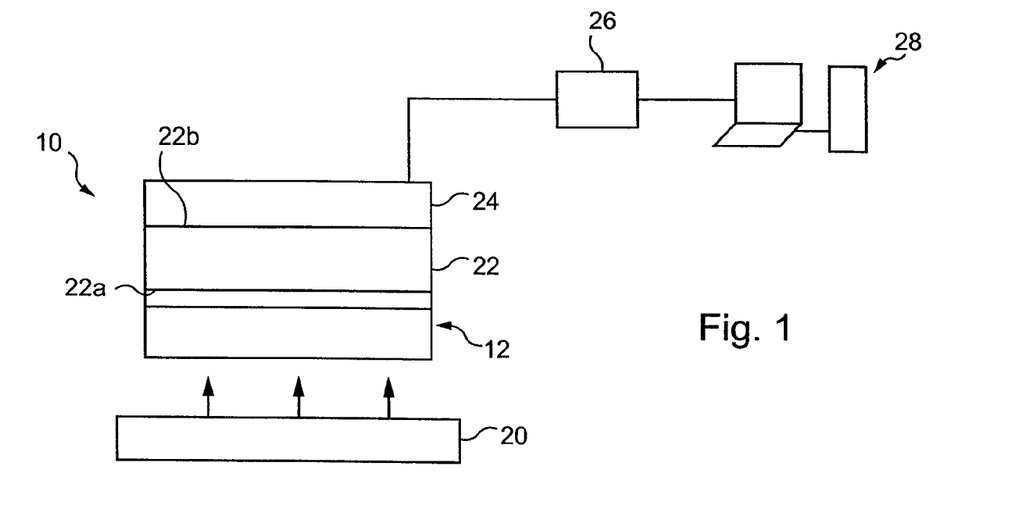
FIG. 1 is a schematic view of a photostimulable plate reading device according to the invention.

As depicted in FIG. 1, a photostimulable plate reading device denoted by 10 is used to read image data that is contained in one or several photostimulable plates only one of which referenced 12 is represented.

It is noted that several photostimulable plates each carrying different image data may be read simultaneously or sequentially in the device 10, although not represented in the drawings.

One of the preferred applications of the present invention relates to the dental radiology field.

In this field, conventionally a photostimulable plate such as plate 12 in FIG. 1 is placed within a disposable envelope (not represented), also called pouch, with a view to being disposed within the mouth of a patient.

This plate 12 is for example flexible.

The disposable envelope aims at protecting the image data of the intraoral photostimulable plate against contamination. It also acts as a barrier providing opacity to external light, thereby preventing light from entering into the envelope and interacting with the photostimulable plate.

Conventionally, when placed within the patient's mouth, the envelope is exposed to X radiation generated by an X-rays source that emits radiation towards the teeth of the patient.

After being exposed to radiation, the disposable envelope is withdrawn from the patient's mouth, the photostimulable plate is removed from its envelope under an appropriate light exposure in order to avoid starting the reading the plate.

Next, the photostimulable plate such as plate 12 in FIG. 1 is disposed in the reading device 10, also called Computed Radiography (CR) reader.

Figure 2:
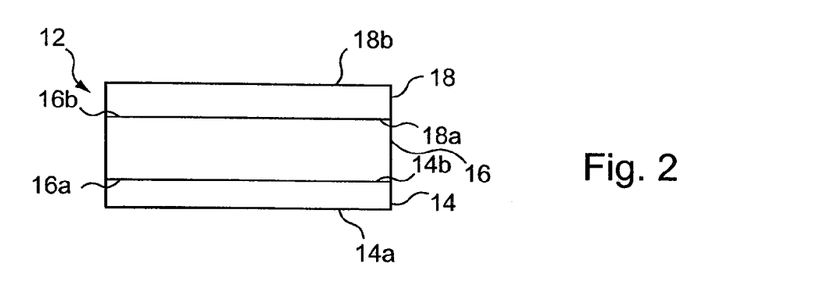
FIG. 2 is an enlarged view of a photostimulable plate which may be used in the FIG. 1 device.

As more particularly illustrated in FIG. 2, the photostimulable plate 12 includes a substrate 14 having two opposite surfaces 14a and 14b and serving as a support for a phosphor layer or phosphor screen 16.

The phosphor layer 16 has two opposite surface 16a and 16b and its first surface 16a (bottom surface) rests on the top surface 14b of the substrate 14.

The phosphor layer 16 is a dispersion layer containing image data which has been acquired during X-rays exposure.

For instance, this functional component is made of Barium Fluoro Bromide Iodide (BaFBrI).

However, other materials or a combination of other materials or compounds may be alternatively envisaged.

The substrate 14 is, for example, made of vinyl but other compositions may alternatively be used.

Optionally, an overcoat 18 acting as a protective layer is deposited on the second opposite surface 16b (top surface) of the phosphor screen 16 e.g. by a coating process known in the art.

This overcoat has a first surface 18a (bottom surface) in contact with the surface 16b of the screen 16 and a second opposite free surface 18b (top surface).

During X-ray exposure, this surface 18b is facing the X-rays source.

It is noted that the substrate 14 is transparent to light emitted by illuminating means.

As depicted in FIG. 1 the photostimulable plate 12 is back lighted by illuminating means 20 which emits light in a first wavelength range. This emitted light homogeneously illuminates the free surface 14a of the substrate 14.

Illuminating means 20 is for example a collection of individual sources of light such as electroluminescent diodes (LED) or laser diodes.

Uniformity components or an appropriate device may be interposed on the optical path between the light sources and surface 14a to render the bundle of light rays as homogeneous as possible.

Such components or appropriate device may be an optical diffuser, one or several reflectors or a combination of the components.

It is noted that in some situations the source of light in itself may produce a sufficiently homogeneous bundle of light rays, thereby rendering any additional optical components or device superfluous.

When thus illuminated the phosphor screen 16 of the plate 12 is caused to emit light in a second wavelength range by the known process of photostimulated luminescence and to scatter light in the first wavelength range.

The reading device 10 further comprises filtering means 22 facing the surface 18b of the photostimulable plate 12 opposite the surface which faces the back light 20.

Filtering means 22 may be disposed by one of its sides, the side 22a, in close contact with the plate 12, e.g. by bonding to the surface 18b thereof.

Generally speaking, filtering means 22 allows light emitted in the second wavelength range to pass and prevents light emitted in the first wavelength range (stimulating back light) from traversing the filtering means.

The reading device 10 also comprises detecting means 24 which is arranged on the opposite side 22b of filtering means 22 e.g. by bonding.

Detecting means is composed of a two dimensional array of pixels. More particularly, it includes at least one image sensor such as a CCD sensor or CMOS sensor.

Preferably, detecting means 24 includes a CMOS sensor having a two dimensional array of pixels, each pixel having a dimension of for example 20 μm.

In order to increase the sensor sensitivity to the light emitted in the second wavelength range, the quantum efficiency of the CMOS sensor may be optimized at the desired wavelength, in particular by appropriately tailoring its substrate thickness.

For instance, the thickness of the silicon substrate of the CMOS sensor should be optimized to maximize quantum efficiency in the blue spectrum.

Detecting means 24 aims at capturing image data carried by the photostimulable plate 12 and read by device 10 under appropriate illumination (stimulating light).

Such image data are contained in the light transferred by filtering means 22 in the second wavelength range, whereas filtering means 22 prevents undesired light wavelength from being transferred and reaching detecting means.

Further, detecting means provides an analog electronic signal representative of the read image data.

An electronic unit 26 is connected to detecting means 24 in order to receive and process the electronic signal, e.g. through converting and amplifying means, and send it to a display unit 28 of a computer for display and exploitation of the read image data.

Figure 3:
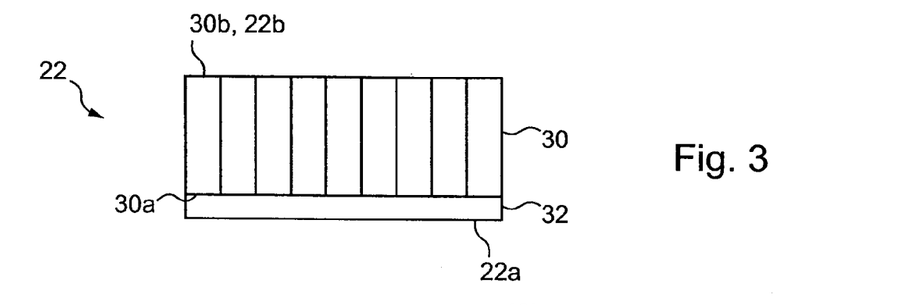
FIG. 3 is an enlarged view of filtering means which may be used in the FIG. 1 device.

More particularly and with reference to FIG. 3, filtering means 22 includes a plurality of optical fibers 30 having two large opposite surfaces 30a and 30b.

The main function of this plurality of optical fibers is to guide light stemming from plate 12 from surface 30a where it enters the plurality of optical fibers all the way to the opposite surface 30b through its thickness.

The plurality of optical fibers 30 is for example a fiber optic plate, composed of an array of optical fibers.

In a first embodiment illustrated in FIG. 3, the block 30 may be coated with one filtering unit 32 unit.

This single filtering unit acts as a selective coating for reflecting or absorbing stimulating light (light emitted in the first wavelength range) and transferring light converted by the photostimulable plate 12 and carrying image data (light emitted in the second wavelength range).

In a preferred embodiment, photostimulable plate 12 is arranged above filtering means 22 and detector 24 contrary to the arrangement of FIG. 1.

Filtering unit 32 is disposed on the surface 30a of the block 30 facing the incoming light.

More particularly, filtering unit 32 is for example coated on the surface 30a through a known coating process.

The filtering unit 32 is a thin multilayered filter comprising a plurality of superimposed layers with different refractive indices and assembled all together. The layers are for example glass layers.

Each layer enables the light rays in a first wavelength to pass and the light rays in a second wavelength to deviate.

This multilayered filter acts as an interference filter.

The assembly of superimposed layers is obtained through a known process.

This structure has to be thin so as to avoid any blurry effect.

In practice, the thickness of the multilayered filter is comprised between 10 and 500 μm and for instance is equal to 100 μm.

Since the filtering unit 32 is thin it is not rigid enough by itself and therefore need to be mechanically supported.

The block of optical fibers 30 provides the required mechanical rigidity thanks to its thickness.

The thickness of the block is comprised between 1 mm and several centimeters and for example is equal to 4 mm.

The block of optical fibers 30 is transparent to the light emitted in the first wavelength range and should be transparent in the second wavelength range. It mainly serves as a mechanical support for the filtering unit.

Optionally, the plurality of optical fibers block may be tapered in order to guide and transmit light in a convergent manner up to the active surface of an image sensor of reduced dimensions compared with the dimensions of the photostimulable plate.

The filtering efficiency of the filtering unit or in other words its attenuation ratio substantially allows the whole undesired light to be rejected.

The opposite surface 30b is to be fixed to the detector 24 so that the latter receives light transferred by the filter 22.

Thus, the filter 22 is adapted to allow substantially 1000000 times more light emitted in the second wavelength range to pass than light emitted in the first wavelength range (undesired light).

Figure 4:
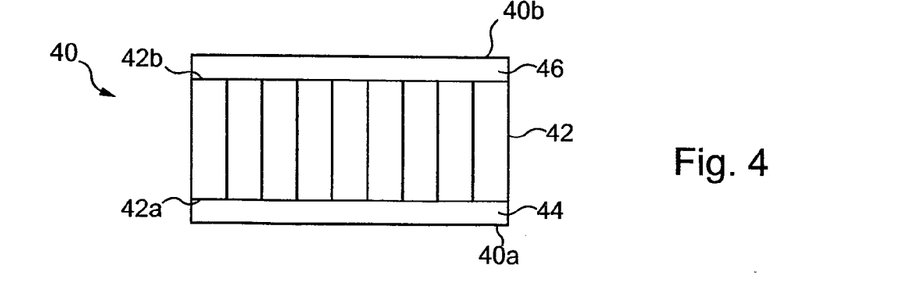
FIG. 4 is an enlarged view of filtering means which may be used in the FIG. 1 device.

In a second embodiment illustrated in FIG. 4, two filtering units 44 and 46 may be respectively associated with the two opposite surfaces 40a and 40b of a block of optical fibers 42 for filtering out a predetermined light wavelength range.

This block may be identical to block 30 in FIG. 3.

In particular, each filtering unit prevents light emitted in the first wavelength range from passing and allows light emitted in the second wavelength range to pass.

When two filtering units are provided each of them may be designed so as to filter out a predetermined proportion of undesired light.

Thus, the resulting efficiency of both filtering units substantially allows the whole undesired light to be rejected.

It is noted that the FIG. 4 embodiment may find applications where the filtering efficiency is to be enhanced with respect to the filtering efficiency of the FIG. 3 embodiment.

The filtering units 44, 46 are for example coated on the opposite surfaces 42a, 42b of the block 42 through a known process.

Each filtering unit is, for example, a thin multilayered filter including several superimposed layers as filtering unit 32 in FIG. 3.

The same features, functions and advantages as those provided for above with reference to FIG. 3 apply here and will not be repeated.

In a preferred embodiment, photostimulable plate 12 is arranged above filtering means 40 and detector 24.

Figure 5:
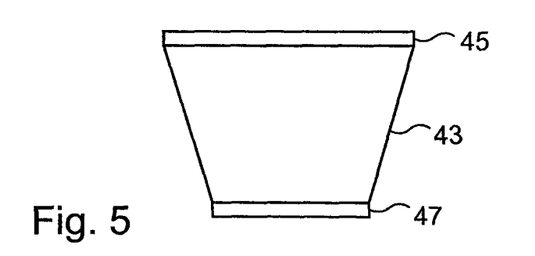
FIG. 5 illustrates a variant of filtering means which may be used in the FIG. 1 device.

In a variant illustrated in FIG. 5, a block of optical fibers 43 may be tapered in order to guide and transmit light in a convergent manner up to the active surface of an image sensor of reduced dimensions compared with the dimensions of the photostimulable plate. Two filtering units 45 and 47 are respectively associated with the inlet surface and the outlet surface of the block 43 and sized appropriately.

The features, functions and advantages of the filtering units and the block are the same as those provided for in relation to FIG. 4 and will not be repeated here.

As a variant to the filter 22 of FIG. 3 the block 30 may be optionally made of a material or a combination of materials that has inherent optical filtering properties. This means that predetermined light wavelengths entering the inlet of the optical fibers will be reflected/absorbed and will not reach the outlet of the optical fibers.

This enables enhancement of the attenuation ratio of the filter and therefore increases the rejection rate of the quantity of light scattered in the first wavelength range.

Also, the attenuation ratio of the filter 40 in FIG. 4 may be enhanced likewise.

Still according to the variant, the thickness of the filtering optical fibers block 30 or 40 may be increased to further enhance the filtering efficiency.

Figure 6:
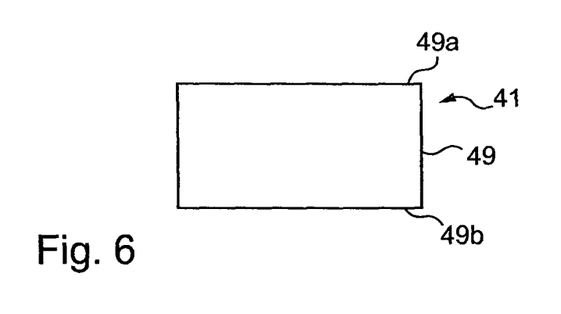
FIG. 6 illustrates another variant of filtering means which may be used in the FIG. 1 device.

FIG. 6 illustrates another variant of filtering means 22 that may be used in the FIG. 1 device.

According to this variant, filtering means 41 includes a plurality of optical fibers in a block or plate 49 that has inherent optical filtering properties.

More particularly, optical fibers are embedded in an opaque substrate.

Ideally, the optical fibers have a numerical aperture which is as high as possible so as to accommodate as much incoming light as possible and a good rejection in the first wavelength range (e.g. red colour).

The numerical aperture NA of an optical fiber is given by the following formula:

$$NA=(nf^2-nc^2)^{1/2}$$

where of is the refractive index of the core of the optical fiber and nc is the refractive index of the clad thereof.

For example, the optical fibers are made from ZB2 which is a glass material commercialized by the company Shanghai Fan Guang Ltd Co and having a core refractive index of 1.5.

In order to increase the numerical aperture of the optical fibers the proportion of metallic oxide has been augmented in the ZB2 glass material.

For instance, the resulting glass material contains 35% more metallic oxide than the ZB2 glass material and the resulting core refractive index is of 1.8. This leads to a numeric aperture of 0.994. It is to be noted that the proportion of metallic oxide may be above 35% if desired.

Optionally, filtering means 41 may include one filtering unit (not represented in the drawing) e.g. coated on one of the upper and lower opposite surfaces 49a and 49b.

Alternatively, two filtering units (not represented in the drawing) may be coated on the two opposite surfaces 49a and 49b.

The filtering unit or filtering units have the same features and properties as the filtering units represented in FIGS. 3 to 4 as described above.

Providing optical fibers block 49 with one filtering unit or two filtering units enables enhancement of the attenuation ratio of filtering block 49 and therefore increases the rejection rate of the quantity of light scattered in the first wavelength range.

In a variant not illustrated in the drawings, optical fibers block 49 may be tapered with a view to obtaining the same features and advantages as those provided for in relation to FIG. 5 arrangement.

Such tapered optical fibers block 49 may also be equipped with one filtering unit or two filtering units in accordance with needs.

In a preferred application, light that is emitted by illuminating means 20 in the first wavelength range is lying for example between 590 and 630 µm and is of red colour.

When illuminated by stimulating red light the phosphor screen 16 is caused to emit light in the second wavelength range lying between 390 and 450 µm and is of blue colour.

Thus, light extracted from the photostimulable plate 12 through surface 18b is a combination of converted blue light including image data and stimulating red light scattered in the plate.

Filtering means used in the reading device 10 according to the invention is particularly suited for allowing blue light to pass and rejecting red light.

The filtering unit 32 of filter 22 (FIG. 3) and the filtering units 44 and 46 of filter 40 (FIG. 3) are each composed of several filtering layers, each transmitting blue light and rejecting red light.

Next, detector 24 captures blue light transmitted by filter 22 or filter 40 and converts it into an electronic signal that is to be processed as described above.

Figure 7:
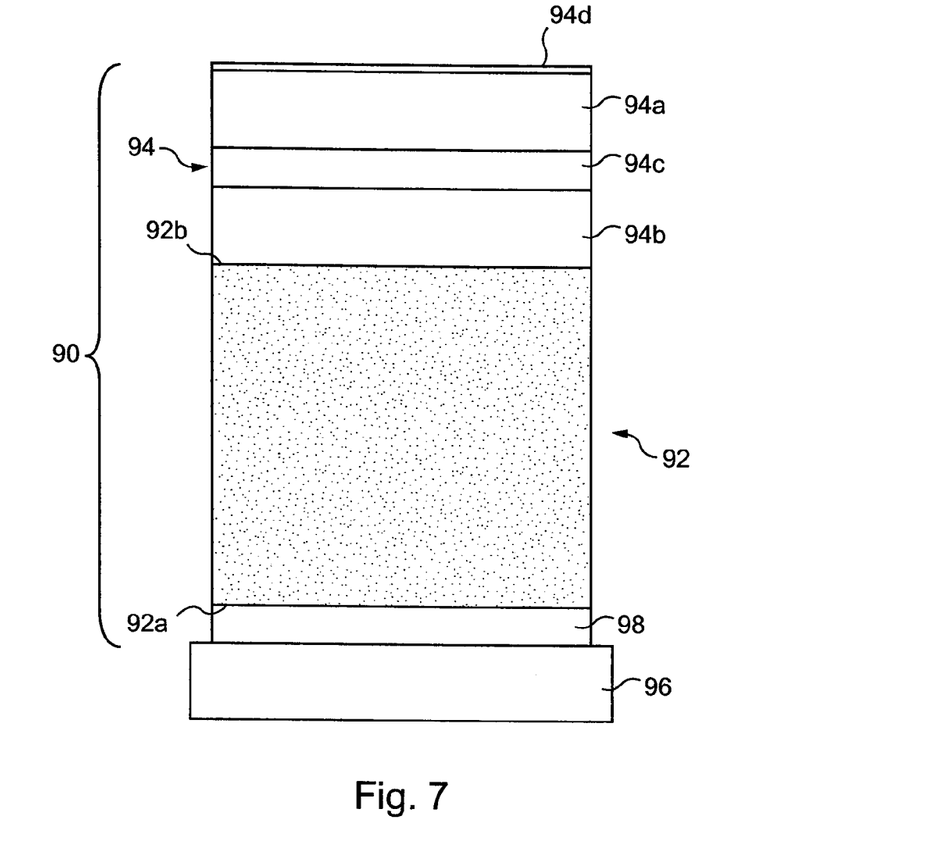
FIG. 7 is a schematic view of an assembly of filtering means and detecting means which may be used in the FIG. 1 device.

FIG. 7 represents an alternative embodiment of filtering means 22 that are suitable for being used in association with a photostimulable plate and illumination means.

According to this new arrangement, filtering means 90 includes light guiding means 92 which serves as a mechanical support for a filter 94 that is attached to only one side of light guiding means 92.

For instance, such light guiding means includes a block of optical fibers which may be identical to block 30 in FIG. 3 or block 40 in FIG. 4.

Filter 94 is arranged on the side of filtering means 90 which receives light coming from the output of the photostimulable plate.

Filter 94 performs the whole optical attenuation of filtering means 90, whereas in an alternative embodiment, light guiding means 92 may also provide optical attenuation to some extent.

More particularly, filter 94 includes several sets of superimposed layers, two consecutive sets of layers being divided by a buffer layer.

This buffer layer prevents the two proximate filtering layers (interference filters) from interacting therebetween and transmits light that is allowed to pass by one of the filtering layers.

In FIG. 7, filter 94 is a coating filter comprising two coating layers 94a and 94b physically separated by a buffer layer 94c.

However, in a variant that is not described several sets of coating layers divided by a buffer layer may be envisaged.

Each coating layer 94a and 94b is a thin multilayered filter of the same type as filtering unit 32 in FIG. 3 and filtering units 44 and 46 in FIG. 4.

Coating filter 94 includes a top layer 94d which protects its from any damages, in particular, when close contacting the photostimulable plate positioned above (not represented in the drawings) with filtering means 90 and during the reverse operation.

Top layer 94d is made of a solid material which is for example made of aluminium oxide.

It is noted that the buffer layer 94c acts as a barrier between two coating layers 94a and 94b in order to exclude their mutual influence against each other.

The thickness of the buffer layer is suitable for performing this function.

The arrangement of FIG. 7 further includes detector means 96 which may be firmly attached to filtering means 90 in order to avoid any potential optical effect between the detecting means 96 and filtering means 90.

For instance, detecting means 96 may be glued directly to the bottom face 92a of light guiding means 92 opposite the top face 92b on which filter 94 is deposited.

Bonding of detecting means 96 to filtering means 90 is obtained in a known manner through an optical glue 98 which also prevents any undesired optical effect between detecting means 96 and filter 94 form occurring.

The assembling of filtering means 90 and detecting means 96 can be made easily through the gluing process.

It is noted that detecting means 96 may de identical to detecting means 24 in FIG. 1.

Figure 8:
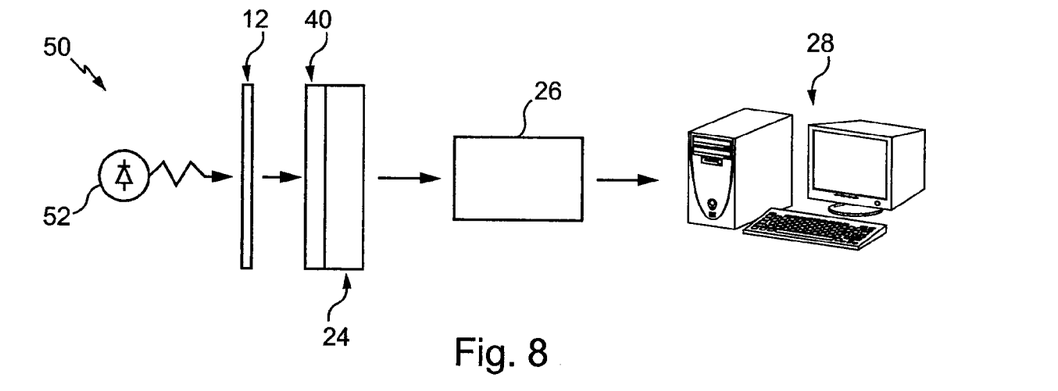
FIG. 8 is a schematic view of another embodiment of a photostimulable plate reading device according to the invention.

FIG. 8 illustrates an alternative embodiment of a photostimulable plate reading device. In this embodiment, device 50, the photostimulable plate 12, filtering means 40, detecting means 24, electronics 26, and processing unit and display 28 of FIG. 1 remain unchanged.

Illuminating means is a light source 52 which may be, for example, selected from the following light sources: an electroluminescent diode (LED), a laser diode, a plurality of LEDs or laser diodes possibly associated with an optical diffuser.

Such light source 52 is represented under the form of a diode in FIG. 8. Light source is at a distance from the backside of the photostimulable plate 12 that is sufficient for homogenously illuminating it.

It is noted that the arrow between photostimulable plate 12 and filtering means 40 means that photostimulable plate 12 is placed in close contact to filtering means for its reading.

The above arrangement provides an alternative way to homogeneously illuminate the backside of the photostimulable plate 12, i.e. the surface 14a of the substrate 14 in FIGS. 1 and 2.

Figure 9:
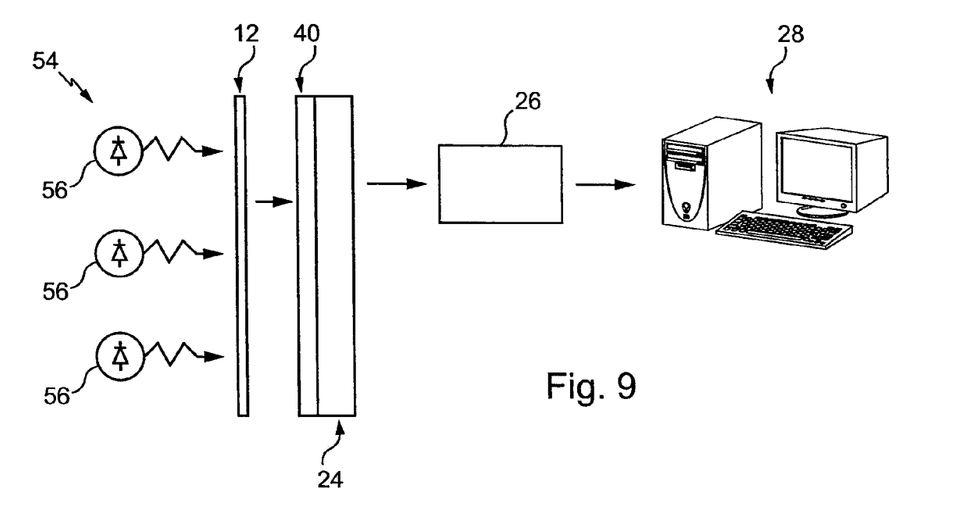
FIG. 9 illustrates a variant of FIG. 8 device.

FIG. 9 illustrates a reading device 54 according to a variant in which a plurality of LEDs 56 are arranged parallel to each other facing the backside of photostimulable plate 12 to provide an homogenous illumination thereon.

According to another variant which is not represented in the drawings light source may be indirectly directed to the backside of photostimulable plate 12 so as to reduce the overall dimensions of the reading device.

For example, light source illuminates an optical device including culminating optics such as optical collimators, lens, mirror or of holographic type.

Light passing through this optical device is reflected by reflecting means towards the back side of the photostimulable plate 12.

More particularly, reflecting means includes a narrow band diachronic mirror.

According to a further variant which is not represented in the drawings one or several mirrors may be placed on the path of the light emitted by the light source, thereby lengthening the optical path of the light.

This leads to a reduction in size of the reading device, at least in the part that is dedicated to the illumination of the photostimulable plate.

Furthermore, optional lens may be placed in front of the light source so as to adapt the dimensions of the bundle of light rays in accordance with the dimensions of the photostimulable plate and the length of the optical path between light source and the backside of the plate.

Figure 10:
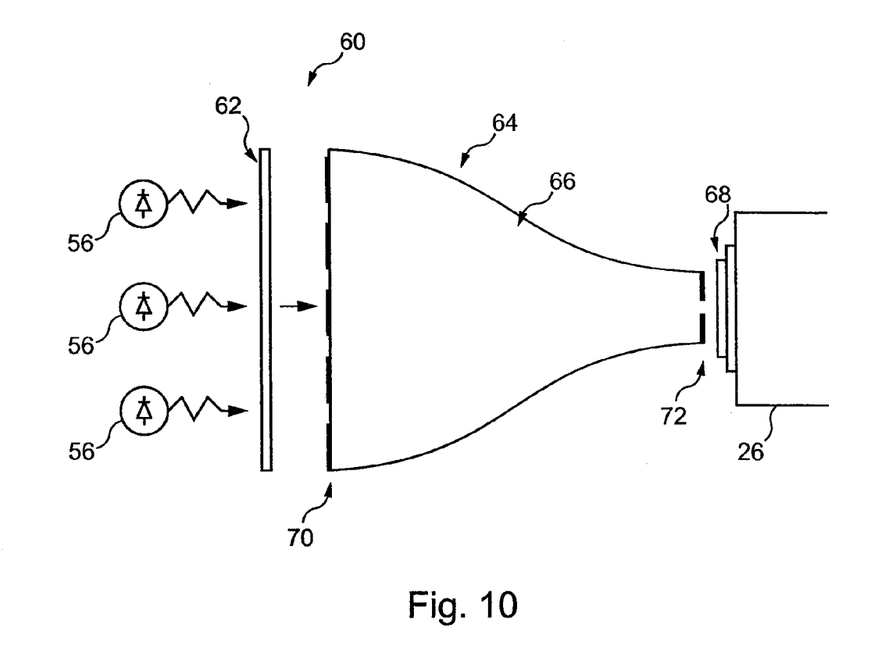
FIG. 10 is another alternative embodiment of a photostimulable plate reading device according to the invention.

FIG. 10 shows an alternative embodiment of a photostimulable plate reading device 60 taking over some of the elements depicted in FIG. 9 such as the plurality of light sources 56.

The reading device 60 also includes a photostimulable plate 62 which has the same structure as photostimulable plate 12 of FIG. 2 but with enlarged dimensions.

The reading device includes filtering means 64 which is arranged in close contact with photostimulable plate 62 although not represented as such in the drawing. Filtering means includes a tapering block of optical fibers 66 the aim of which is to guide light arriving on the side of the block 62 in contact with photostimulable plate 62 and focus it on detecting means 74 of smaller dimensions with respect to those of detecting means 24 in FIG. 1.

For instance, detecting means 68 may be identical to detecting means 24 in FIG. 1 except for the dimensions.

Filtering means 64 includes on each opposite side of the block 68 two filtering units 70 and 72 the function of which is identical to that of filtering units 44 and 46 in FIG. 4.

In addition, the block of tapered optical fibers 66 in itself may be further provided with filtering properties so as to enhance the percentage of reflectance of undesired light (light in the first wavelength range).

It is noted that detecting means may include a CCD image sensor or a CMOS image sensor.

As in FIG. 1 detecting means 68 is connected to electronic means 26 for processing the signal output provided by means 68.

Processing and display unit 28 is connected to electronic means although not represented in the drawing.

It is noted that further software data processing may be applied to the image data read from the photostimulable plate, filtered, detected and converted in digital form.

For instance, software data processing may be carried out for correcting the homogeneity of the illuminating means in case such means do not provide sufficiently homogeneous illumination.

Such a processing may be based on a preliminary reading of the photostimulable plate that has been fully exposed to X radiation without any patient between the source of X radiation and the photostimulable plate. This preliminary reading gives rise to a reference signal which will be used later on for correcting several subsequent readings of the photostimulable plate including image data. The image signals obtained from the readout of the photostimulable plate will thus be compensated for by the reference signal.

Another method of improving the quality of the image signal obtained from the readout of the photostimulable plate may be envisaged based on averaging several image signals.

For instance, the average may be made on the signals obtained from the readout of several photostimulable plates, e.g. ten plates, which have been previously fully exposed to X radiation (without patient). Thus, ten image signals are produced.

By performing an average on each of the successive image signals obtained for the plurality of plates respectively a reference image signal or "flat field" is thus elaborated. It is therefore possible to get rid of defects, errors, etc. which may occur or be present in the plates or at least to lessen their influence thanks to this flat field.

Such averaging allows to compensate nonuniformity of stimulating radiation or optical fiber system or sensitivity of various zones of a sensor.

Likewise, it is also possible to compensate for the defects that are linked with the optical means, e.g. the position of the light source(s), their illumination level, etc., the filtering means, the optical fibers, etc. . . .

It is contemplated that numerous modifications may be made to the exemplary embodiments of the invention without departing from the spirit and scope of the embodiments of the present invention as defined in the following claims.

The invention claimed is:

1. A photostimulable plate reading device, comprising;
   at least one photostimulable plate carrying image data and having two opposite surfaces;
   an illuminating device configured to homogeneously illuminate a first one of the two opposite surfaces of the at least one photostimulable plate with light emitted in a first wavelength range, the illumination causing the at least one photostimulable plate both to emit light in a second wavelength range by photostimulated luminescence and to scatter light in the first wavelength range;
   a filter device configured to prevent the light scattered in the first wavelength range from passing and for allowing the light emitted in the second wavelength range to pass, the filter device facing a second one of the two opposite surfaces of the at least one photostimulable plate; and
   a detector composed of a two dimensional array of pixels for detecting the light allowed to pass and for obtaining image data therefrom,
   wherein the filter device includes a block of optical fibers having two opposite surfaces and a thin multilayered filter bonded to a surface of the block of optical fibers facing the second one of the two opposite surfaces of the at least one photostimulable plate, the at least one photostimulable plate being bonded to the multi-layer filter, the thin multilayered filter including several superimposed layers each having a different refractive index.

2. The photostimulable plate reading device of claim 1, wherein the at least one photostimulable plate is glued to the filter device.

3. The photostimulable plate reading device of claim 1, wherein the at least one photostimulable plate comprises:
   a substrate having two opposite surfaces and that is transparent to light emitted in the first wavelength range; and
   a phosphor layer having two opposite surfaces and being arranged by a first surface on one of the two opposite surfaces of the transparent substrate, the second opposite surface of the phosphor layer facing the filter device.

4. The photostimulable plate reading device of claim 3, wherein the transparent substrate is facing the illuminating device.

5. The photostimulable plate reading device of claim 1, wherein the filter device is adapted to allow substantially 1000000 times more light emitted in the second wavelength range to pass than light emitted in the first wavelength range.

6. The photostimulable plate reading device of claim 1, wherein the at least one photostimulable plate is arranged between the illuminating device and the filter device.

7. The photostimulable plate reading device of claim 1, wherein the filter device includes a block of optical fibers, each optical fiber having a core with a refractive index around 1.8 and a clad surrounded by the core, the clad having a refractive index around 1.5.

8. The photostimulable plate reading device of claim 1, wherein the thin multilayered filter is configured to prevent light scattered in the first wavelength range from passing and allowing light emitted in the second wavelength range to pass, the block of optical fibers configured to guide light emitted in the second wavelength range and allowed to pass.

9. The photostimulable plate reading device of claim 8, wherein the thin multilayered filter has a thickness comprised between 10 and 500 µm.

10. The photostimulable plate reading device of claim 8, wherein the block of optical fibers is transparent.

11. The photostimulable plate reading device of claim 8, wherein the block of optical fibers further prevents light scattered in the first wavelength range from passing and allows light emitted in the second wavelength range to pass.

12. The photostimulable plate reading device of claim 8, wherein the block of optical fibers has a numerical aperture limiting the incidence of light allowed to pass by the thin multilayered filter.

13. The photostimulable plate reading device of claim 8, wherein the block of optical fibers has a thickness comprised between 1 mm and several centimeters.

14. The photostimulable plate reading device of claim 1, wherein the superimposed layers are glass layers.

15. The photostimulable plate reading device of claim 1, wherein the filter device includes a block of optical fibers having two opposite surfaces and two thin multilayered filters each respectively disposed on one of the two opposite surfaces of the block of optical fibers, the thin multilayered filters preventing light scattered in the first wavelength range from passing and allowing light emitted in the second wavelength range to pass, the block of optical fibers guiding light.

16. The photostimulable plate reading device of claim 15, wherein the thin multilayered filter includes several superimposed layers having each a different refractive index.

17. The photostimulable plate reading device of claim 16, wherein the superimposed layers are glass layers.

18. The photostimulable plate reading device of claim 15, wherein the thin multilayered filter has a thickness comprised between 10 and 500 μm.

19. The photostimulable plate reading device of claim 15, wherein the block of optical fibers is transparent.

20. The photostimulable plate reading device of claim 15, wherein the block of optical fibers further prevents light scattered in the first wavelength range from passing and allows light emitted in the second wavelength range to pass.

21. The photostimulable plate reading device of claim 15, wherein the block of optical fibers has a numerical aperture limiting the incidence of light allowed to pass by the thin multilayered filter.

22. The photostimulable plate reading device of claim 15, wherein the block of optical fibers has a thickness comprised between 1 mm and several centimeters.

23. The photostimulable plate reading device of claim 1, wherein light emitted in a first wavelength range is of red colour and light emitted in a second wavelength range is of blue colour.

24. The photostimulable plate reading device of claim 1, wherein the multilayered filter is coated on the surface of the block of optical fibers facing the second one of the two opposite surfaces of the at least one photostimulable plate.

25. A photostimulable plate reading device, comprising:
at least one photostimulable plate carrying image data and having two opposite surfaces;
illuminating means for homogeneously illuminating a first one of the two opposite surfaces of the at least one photostimulable plate with light emitted in a first wavelength range, the illumination causing the at least one photostimulable plate both to emit light in a second wavelength range by photostimulated luminescence and to scatter light in the first wavelength range;
filtering means for allowing substantially 1000000 times more light emitted in the second wavelength range to pass than light emitted in the first wavelength range, the filtering means facing a second one of the two opposite surfaces of the at least one photostimulated plate; and
detecting means composed of a two dimensional array of pixels for detecting the light allowed to pass and for obtaining image data therefrom, wherein the photostimulable plate is bonded to the filtering means and the filtering means is bonded to the detecting means.

26. A photostimulable plate reading device, comprising:
at least one photostimulable plate carrying image data;
illuminating means for homogeneously illuminating the at least one photostimulable plate with light emitted in a first wavelength range, the illumination causing the at least one photostimulable plate both to emit light in a second wavelength range by photostimulated luminescence and to scatter light in the first wavelength range;
filtering means for preventing the light scattered in the first wavelength range from passing and for allowing the light emitted in the second wavelength range to pass, the at least one photostimulable plate being arranged between the illuminating means and the filtering means; and
detecting means composed of a two dimensional array of pixels for detecting the light allowed to pass and for obtaining image data therefrom,
wherein the photostimulable plate is bonded to the filtering means and the filtering means is bonded to the detecting means.

* * * * *